R. SMITH & R. STEPHENSON.
HEATING FURNACE.
APPLICATION FILED MAY 10, 1912.

1,052,183.

Patented Feb. 4, 1913.

UNITED STATES PATENT OFFICE.

ROBERT SMITH AND ROBERT STEPHENSON, OF INDIANA HARBOR, INDIANA.

HEATING-FURNACE.

1,052,183.  Specification of Letters Patent.  Patented Feb. 4, 1913.

Application filed May 10, 1912. Serial No. 696,431.

*To all whom it may concern:*

Be it known that we, ROBERT SMITH and ROBERT STEPHENSON, citizens of the United States, and both residing at Indiana Harbor, in the county of Lake and State of Indiana, have invented certain new and useful Improvements in Heating-Furnaces, of which the following is a specification.

This invention relates to an improved heating furnace adapted more especially for use in connection with the treatment of iron and steel, and is of a continuous combination regenerating type, wherein the travel of the heated air and gases may be regulated as desired, together with reversible heating means for controlling and directing the flow of the air and gases therethrough.

The essential object of the invention is to increase the efficiency of the heating furnace, wherein the air and gas chambers may utilize the waste heat and send the gas from the regenerating chambers to the furnace at the same time and through the same flues continuously, whereby, when the furnace is reversed, the air and gas traveling through the hot checkers and flues are regenerated, thus appreciably reducing the waste heat and minimizing fuel consumption.

Another object of the invention is to improve the furnace construction generally, including the reversible heating means and valve control.

The invention further consists in the features of construction and combination of parts hereinafter described and claimed.

A preferred form of construction is illustrated in the drawings, wherein—

Fig. 2 is a vertical section taken on line 2—2 of Fig. 1, centrally thereof; Fig. 3 is a vertical section taken on line 3—3 of Fig. 1, through the combustion chamber.

A preferred form of heating furnace structure is shown comprising a furnace roof 12, opposite end walls 13, and a bottom wall 14. The rear end wall has an upper opening 15 for permitting deposit of iron and steel within said furnace upon a plurality of longitudinal rails or pipes 16, as in Fig. 1, which may extend the full width of the main part of the furnace chamber; and said rails or pipes 16 which carry the steel, instead of being straight may be bent as at 17, preferably about ten feet from the discharge end, in order that the steel or iron when it drops out of the furnace ready for the rolling operation will not show cold spots, which is important in this kind of work. These rails or pipes are shown resting upon a series of transverse supporting members 18, substantially U-shaped in cross section as indicated in Fig. 3; and if desired certain of these members may be water cooled as in Fig. 2, wherein the two forward supporting members 19 are thus shown. An inclined runway 20 is provided toward the forward end thereof, for enabling the heated iron or steel to be discharged to a table 21 preparatory to the rolling operation.

Figure 1:
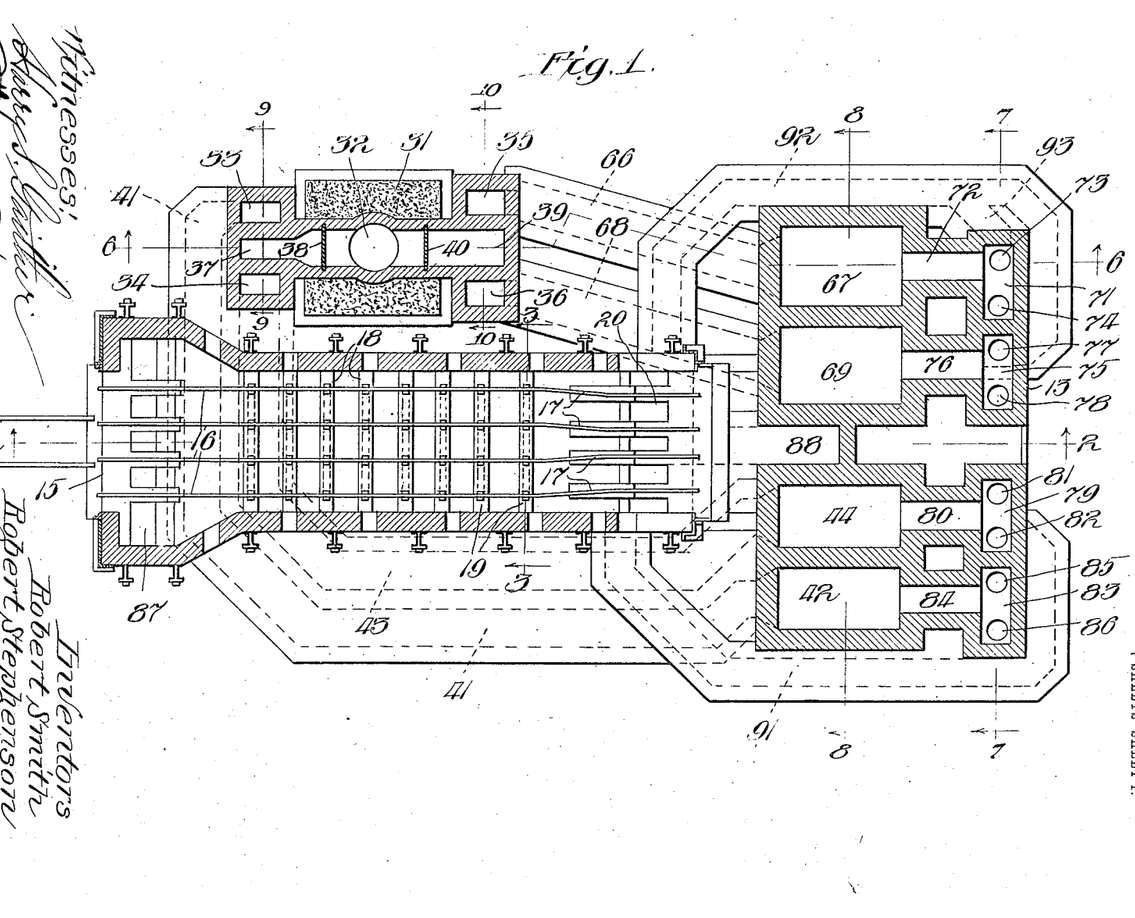
Figure 1 is a horizontal section taken through the upper portion of the heating furnace.

Referring to Fig. 1, a stack foundation 31 and a stack 32 are shown intermediate gas supply chambers 33, 34, and air supply chambers 35, 36; and intermediate said gas supply chambers is a central gas flue 37 in communication with the stack opening 32 provided with a regulating damper 38. Toward the other side of the chimney, an air flue 39 is shown communicating with a stack opening controllable by an intervening regulating damper 40. A series of flues are provided communicating with the respective air and gas chambers, wherein a flue 41 is shown leading from the gas chamber 33 extending downwardly and across the structure opening into a gas regenerating chamber 42. A flue 43 is shown leading from the other gas chamber 34 in like manner to a gas regenerating chamber 44, and the travel of the gases through said flues or passages may be controlled by any suitable valve mechanism.

Figure 9:
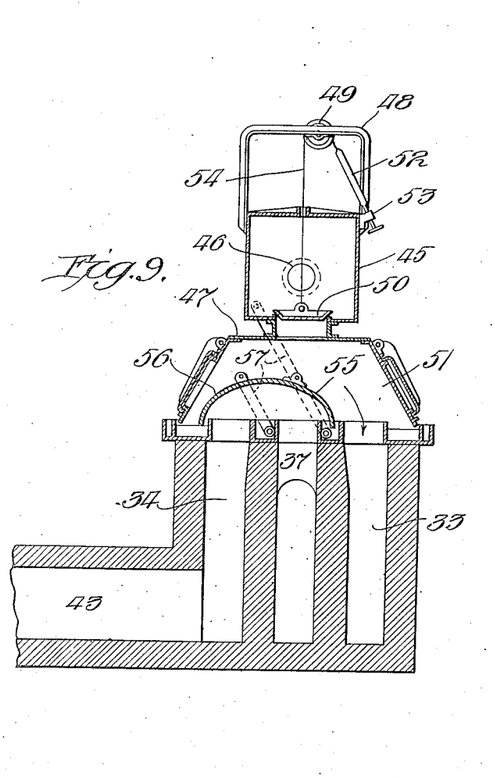
Fig. 9 is a vertical section taken on line 9—9 of Fig. 1, through the gas box and gas chambers but on larger scale than Fig. 1.

In Fig. 9, one form of gas controlling device is shown, wherein a gas box 45, having a gas supply pipe 46, is positioned upon a gas valve structure 47, and the box 45 may have an upright frame 48 carrying a sheave 49, whereby a gas controlling valve 50 may be opened and closed for regulating the flow of gas from the gas box to a valve chamber 51, when a spindle 52 is actuated back and forth within a threaded bearing 53 for moving a valve cord 54. The travel of the admitted gas within the valve chamber 51 is controlled preferably by a Forter valve 55, comprising a curved valve body 56, actuated by companion levers 57 acting in parallelism for a purpose hereinafter explained.

Figure 8:
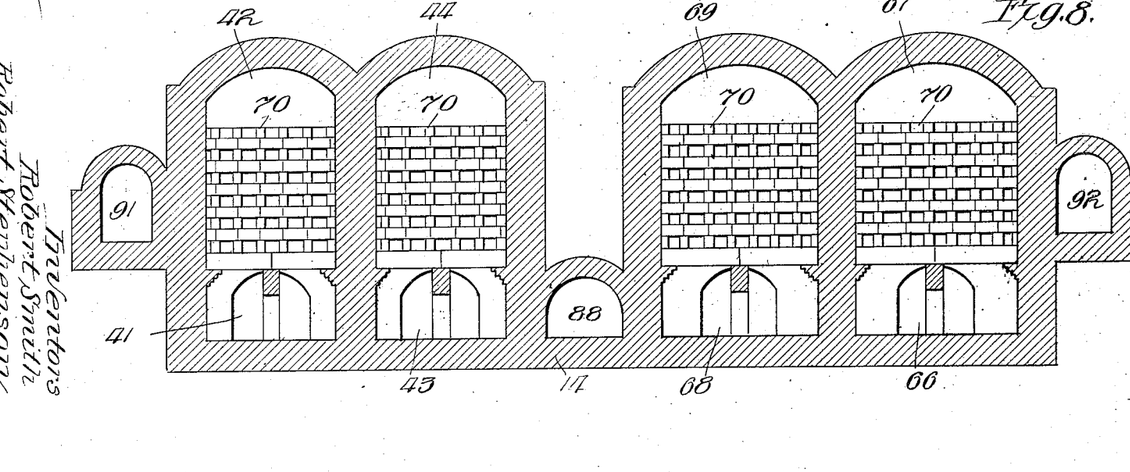
Fig. 8 is a vertical section taken on line 8—8 of Fig. 1, centrally of the respective air and gas regenerating chambers but on larger scale than Fig. 1.
Figure 10:
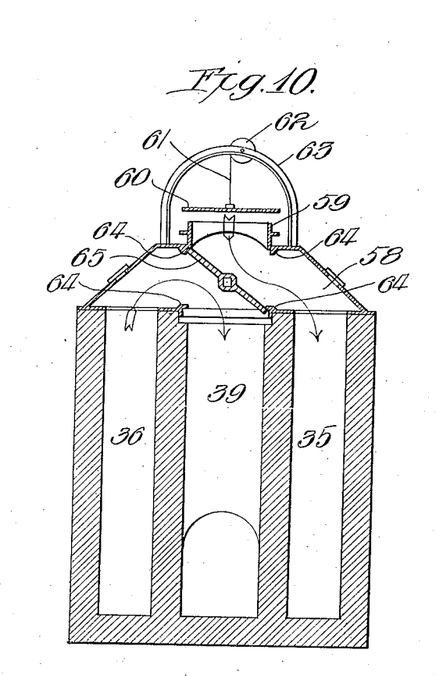
Fig. 10 is a vertical section taken on line 10—10 of Fig. 1, through the air inlet and air supply chambers but on larger scale than Fig. 1.

The air flues 35 and 36, together with the intermediate air stack chamber 39, may be controlled by any suitable means, and a preferred form thereof is shown in Fig. 10, wherein is an upper valve chamber 58 having an inlet projecting valve seat 59 adapted to receive a valve cap 60 adjustable by a valve cord 61 traveling on a sheave 62 journaled in an arched supporting frame 63. Adjacent to the intake opening and in the intermediate passage 39 are shouldered valve seats 64 for engaging a butterfly valve 65 controllable in any suitable manner for regulating the flow of admitted fresh air into the respective chambers. The air supply chamber 35 opens into an air duct 66 terminating in an air regenerating chamber 67, and the air supply chamber 36 opens into an air duct 68 terminating in an air regenerating chamber 69. Furthermore, the respective gas and air regenerating chambers, 42, 44, 67, and 69, may be built up with interior checker-work 70, preferably as shown in Fig. 8.

Figure 7:
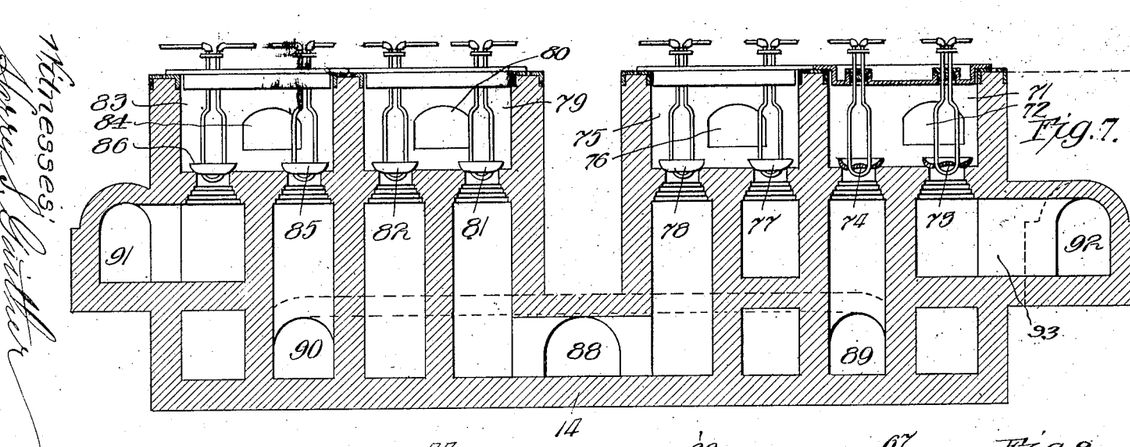
Fig. 7 is a vertical section taken on line 7—7 of Fig. 1, through the air and gas regulating valves but on larger scale than Fig. 1.

Referring to Figs. 1 and 7, a valve box 71 is formed adjacent to the air regenerating chamber 67 and in communication therewith by a passage 72, and said valve box is shown as having two controlling valves 73 and 74. A valve box 75 is likewise shown adjacent to and communicating with the air regenerating chamber 69 by means of a passage 76, and said valve box 75 is shown with valves 77 and 78. Likewise a valve box 79 is shown adjacent to and communicating with the gas regenerating chamber 44, by a passage 80, and said valve box 79 has valves 81 and 82. Again, the gas regenerating chamber 42 communicates with a valve box 83 by means of an intermediate passage 84, and said valve box has controlling valves 85 and 86.

Figure 5:
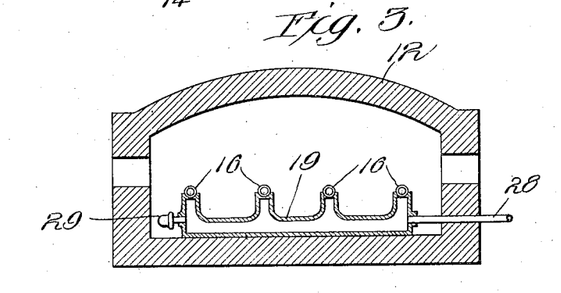
Fig. 5 is a horizontal section taken on line 5—5 of Fig. 2.
Figure 6:
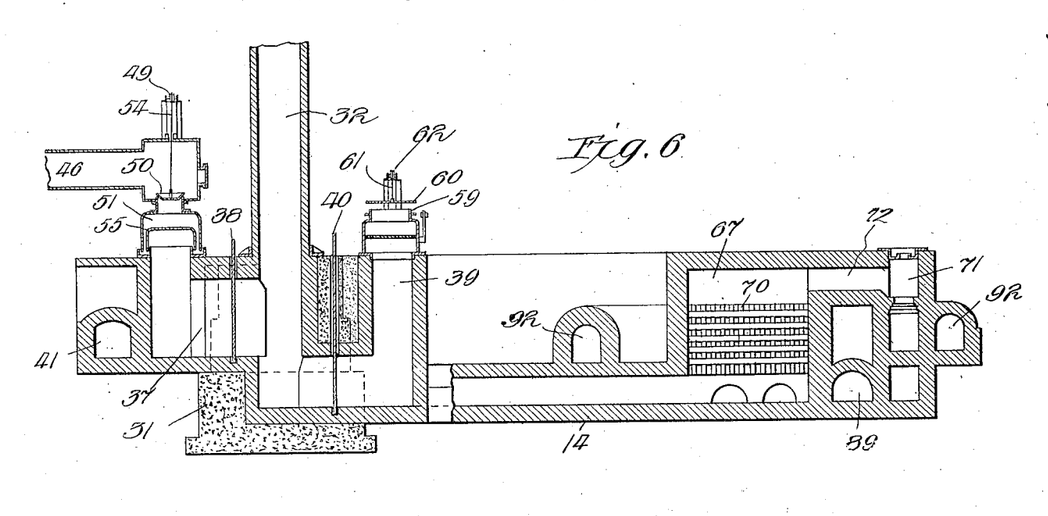
Fig. 6 is a section taken on line 6—6 of Fig. 1.

As shown in Fig. 2, a downcomer 87 is formed adjacent to the rear furnace end wall, opening at its upper end into the furnace chamber and merging at its base into a duct or flue 88, running longitudinally and centrally of the furnace base, and terminating at the extreme forward end of the furnace into opposite transverse ducts or flues 89 and 90, as in Fig. 5, which are in communication with the respective valve boxes 71, 75, 79, and 83, for permitting the combustion gases to be admitted into the respective air and gas regenerating chambers, as desired, during the operation of the heating furnace. The valve 74 controls the admission of the combustion gases through the flue or duct 89, within the valve box 71, through the intermediate passage 72, into the air regenerating chamber 67, as does also the valve 78 for controlling the admission and flow of combustion gases through the valve box 75, thence through the passage 76 into the air regenerating chamber 69. Likewise the admission of the combustion gases into the gas regenerating chambers is controlled by the valve 81 for determining the flow of combustion gas through the valve box 79, and thence through the intermediate passage 80 into the gas regenerating chamber 44. Also, the valve 85 controls the admission of the combustion gases up through the floor duct 90 into the valve box 83, thence through the intermediate passage 84 into the gas regenerating chamber 42.

Figure 4:
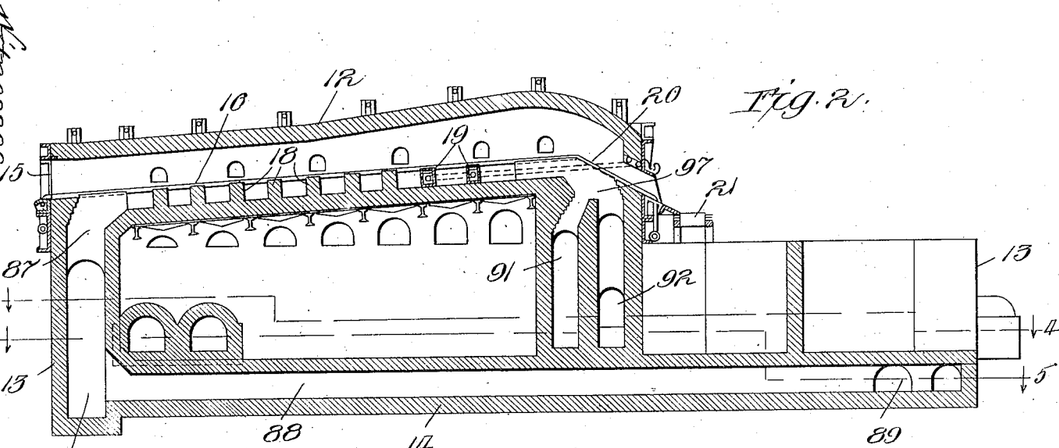
Fig. 4 is a horizontal section taken on line 4—4 of Fig. 2.

As shown particularly in Figs. 1, 4 and 7, companion outer discharging flues or ducts 91 and 92 are formed adjacent to the discharge openings from the respective valve boxes. As shown in Fig. 7, in the valve box 71 the controlling valve 73 opens and closes communication with a discharge duct 93, opening into the flue 92, and as shown in Figs. 1 and 4 the valve 77 in the valve box 75 likewise controls the fluid discharge from the valve box through the duct 94. The valve 82 in the valve box 79 determines the fluid travel therefrom through a duct 95 opening into the flue 91; and the valve 86 in the valve box 83 determines the fluid control therefrom through the discharge duct 96 opening into the flue 91. The gas discharging flue 91 is shown extending across a combustion chamber 97, as does also the adjacent air discharging flue 92, (Figs. 2 and 4) whereby maximum heat combustion is produced therein.

In use and operation, the fresh air being admitted into the air chamber 35 will travel through the flue 66 into the air regenerating chamber 67, thence up through the checker-work 70 and over the passage 72 to the valve box 71, and then down through the opened valve 73 to the air discharging flue 92 to the combustion furnace chamber 97 when the regulation of the butterfly valve is as shown in Fig. 10. Obviously, a reversal of said butterfly valve 65 will cause the admitted fresh air to travel through the air chamber 36 instead of 35, so that the admitted fresh air will pass through the flue 68 instead of the flue 66 into the air regenerating chamber 69, thence upwardly through the checker-work 70 and over the passage 76 to the valve box 75, and down through the valve 77 to the air discharging flue 92 into the furnace combustion chamber 97. When the gas controlling valve 55 is in the position shown in Fig. 9, for permitting the gas to flow into the chamber 33 through the flue 41 to the regenerating chamber 42, it will pass upwardly through the checker-work 70 over the passage 84, to the valve box 83, and down through the valve 86, through the flue 91, thence to the furnace combustion chamber 97, and thence through the furnace to the down-comer 87 through the waste heat flue 88 to the front of the device into the branch flue 90, and upwardly through the open valve 81, through the valve box 79, over the passage 80, and down through the gas regenerating chamber 44, through the checkers 70, and thence discharging into the exhaust flue 43, out through the gas uptake 34, through the downtake passage 37 to the stack 32. By reversing the gas controlling valve 55 so as to initially admit the gas into the intake chamber 34 instead of 33, as in Fig. 9, the flow and travel of the gas is entirely reversed, the gas finally discharging through the uptake chamber 33 instead of 34, and down through the stack duct or flue 37. Thus, it may be desirable to admit the gas and air through the intake chambers 34 and 36 respectively, whereby the flues 43 and 68 will take the gas and air through the regenerating chambers 44 and 69, out through the checkers 70, over the passages 80 and 76, into the valve boxes 79 and 75, the valves 82 and 77 being opened for passing gas and air through the flues 91 and 92 simultaneously to the furnace. The valves 78 and 81 are closed, at which time the valves 85 and 74 are opened for enabling the waste heat to pass from the downcomer 87 through the central flue 88 through said valves into the valve boxes 71 and 83, whereby the combustion gases are carried into the regenerating chambers 42 and 67 and down through the interior checker-work 70, discharging therefrom into the exhaust flues 41 and 66, out through the gas uptake 33 and air uptake 35 into the discharging stack flues 37 and 39, to the stack and out. When the position of the air and gas controlling valves is correspondingly reversed, and the initial gas and air intake is made through the ducts 41 and 66 into the initial gas and air regenerating chambers 42 and 67, the valves 73 and 86 are opened, for simultaneously permitting the travel and discharge into the flues 91 and 92, and thence to the furnace. The valves 81 and 78 are opened for permitting the waste heat and gases traveling from the furnace through the downcomer 87 to the central flue 88 to pass into the valve boxes 75 and 79 through the passages 76 and 80 into the regenerating chambers 69 and 44, and thence downwardly through the checker-work 70, discharging through the exhaust flues 68 and 43, into the respective gas and air uptakes 34 and 36, thence out through the discharging chambers 37 and 39 through the flue to the stack.

By the gas and air working continuously from the regenerating chambers to the furnace, through the flues 91, and 92, considerable saving in heat generation and fuel consumption is effected, since simultaneous, continuous discharge is effected through said flues from the respective generating chambers into the furnace, which keep said flues constantly hot, causing a much better and more uniform draft and travel of said heated gas and air to the furnace for producing maximum combustion. Moreover, by continuously carrying the waste combustion gases through the downcomer 87 and the central flue 88, the same operating advantages are obtainable, since this flue is always heated during the furnace operation.

We claim:

1. In a heating furnace, air inlet chambers, an air flue intermediate said air inlet chambers opening into a stack, gas inlet chambers, a gas discharging flue intermediate said gas inlets opening into said stack, a plurality of air and gas regenerating chambers, a series of separate flues leading from the several air and gas inlets to said regenerating chambers, flues for carrying the heated air and gases from the regenerating chambers to a furnace combustion chamber, a downcomer leading from the furnace merging into a longitudinal waste heat flue, means for controlling the admission of heated combustion gases from said longitudinal flue to the respective regenerating chambers, means for controlling the travel of the heated air and gases from the regenerating chambers to the combustion chamber, means for controlling the admission of air through the air inlets and discharge therefrom, and means for controlling the admission of gas through the gas inlets and discharge therefrom, substantially as described.

2. In a heating furnace, companion air inlet chambers and companion gas inlet chambers, the air inlet chambers having an intermediate discharge flue opening into a stack, and the companion gas inlet chambers having an intermediate gas discharge flue opening into said stack, means for controlling the admission of air to the respective air inlets and discharge therefrom, means for controlling the admission of gas to the respective gas inlets and discharge therefrom, a plurality of air and gas regenerators, a series of flues leading from the respective air and gas inlets to the several regenerating chambers, flues adjacent to and communicating with the regenerating chambers leading to a furnace combustion chamber, a downcomer merging into a waste heat flue extending longitudinally and communicating with the regenerating chambers, valves for controlling the flow of combustion gases from the longitudinal flue to the respective regenerating chambers, and valves for controlling the travel of the heated air and gases from the regenerating chambers through exhaust flues, each of which has ducts communicating with the regenerating chambers, whereby when air and gas are initially admitted through one of the air inlets and one of the gas inlets, a continuous circuit is effected for discharging through the stack, substantially as described.

3. In a heating furnace, air and gas inlet chambers, air regenerating chambers, gas regenerating chambers, flues communicating with said air and gas inlets and regenerating chambers, companion flues communicating with the regenerating chambers for carrying the heated air and gases therefrom to a furnace combustion chamber, whereby a continuous discharge and travel of the heated air and combustion gases is effected, in combination with a downcomer leading from the furnace and merging into a longitudinal waste heat flue for carrying the furnace heat and gases to the respective regenerating chambers, means for controlling the admission of said gases from the waste heat flue to the several regenerating chambers, means for controlling the discharge from the regenerating chambers into the flues leading to the combustion chamber, means for initially admitting and discharging air and gas to and from certain of the regenerating chambers, and means for determining the exhaust of air and gases from the furnace to the stack, substantially as described.

4. In a heating furnace, air and gas inlet chambers, air and gas regenerating chambers, flues adjacent to and communicating with said regenerating chambers leading to a furnace combustion chamber, valves for controlling the discharge of heated air and gases from said regenerating chambers to said flues, whereby a continuous discharge will be effected through said flues to the combustion chamber, in combination with a downcomer leading from the furnace merging into a waste heat flue for carrying the combustion gases from the furnace to the respective regenerating chambers, valves for controlling the admission of said gases into the regenerating chambers, flues from said air and gas inlets to the several regenerating chambers, and means for regulating the initial admission of air and gas within the respective inlets and discharging therefrom through ducts to the stack, substantially as described.

5. In a heating furnace, air and gas inlet chambers, air and gas regenerating chambers, flues from the air and gas inlets to the several regenerating chambers, companion flues for carrying the heated air and gas from the regenerating chambers to the combustion chamber, whereby a continuous discharge of heated air and gases is effected from the regenerating chambers through said flues to the combustion chamber, valves for each of the regenerating chambers for controlling the discharge of heated air and gases therefrom to the flues communicating with the combustion chamber, a downcomer leading from the furnace and merging into an elongated waste heat flue, whereby the combustion gases may be carried from the furnace to the respective regenerating chambers, valves for controlling the admission of combustion gases from said waste heat flue into the regenerating chambers, and means for determining the admission and discharge of air and gases to and from said air and gas inlets into the air and gas flues opening to the stack, substantially as described.

6. In a heating furnace, companion air inlet chambers, companion gas inlet chambers, a stack intermediate said chambers, air and gas flues intermediate the air and gas inlet chambers opening into the stack, an air valve for determining the initial admission of air to one of the inlets and permitting discharge from the other air inlet into the intermediate stack flue, a gas valve for determining the initial admission of gas to one of the gas inlets, and permitting discharge from the other gas inlet into the intermediate stack flue, a plurality of air and gas regenerating chambers, a series of separate flues leading from the respective air and gas inlet chambers into the regenerating chambers, means for conducting the heated air and gases from the regenerating chambers to a furnace combustion chamber, and a downcomer leading from the furnace and merging into an elongated waste heat flue for carrying the waste furnace combustion gases to the respective regenerating chambers, each of the regenerating chambers having a valve for controlling the admission of heated gases from the waste heat flue into the regenerating chambers, and each of the regenerating chambers having another valve for controlling the fluid discharge therefrom into the flues leading to the combustion chamber, substantially as described.

7. In a heating furnace, air inlet chambers, an air flue intermediate said air inlet chambers opening into a stack, gas inlet chambers, a gas discharging flue intermediate said gas inlets opening into said stack, a plurality of air and gas regenerating chambers, a series of separate flues leading from the several air and gas inlets to the gas regenerating chambers, companion flues for carrying the heated air and gases from the regenerating chambers to a furnace combustion chamber, a downcomer leading from the furnace merging into an elongated waste heat flue, and valves for each regenerating chamber, one of said valves controlling the admission of combustion gases from the elongated waste heat flue to the regenerating chambers, and the other valve controlling the discharge of heated air and gases from the regenerating chambers into the flues leading to the combustion chambers, whereby when air and gas are initially admitted through the air and gas inlets a continuous circuit is effected for discharging through the stack, substantially as described.

8. In a heating furnace, air inlet chambers, an air flue intermediate said air inlet chambers opening into a stack, gas inlet chambers, a gas discharging flue intermediate said gas inlets opening into said stack, a plurality of air and gas regenerating chambers, a series of separate flues leading from the several air and gas inlets to the gas regenerating chambers, companion flues for carrying the heated air and gases from the regenerating chambers to a furnace combustion chamber, a downcomer leading from the furnace merging into an elongated waste heat flue, valves for each regenerating chamber, one of said valves controlling the admission of combustion gases from the elongated waste heat flue to the regenerating chambers, and the other valve controlling the discharge of heated air and gases from the regenerating chambers into the flues leading to the combustion chambers, an air valve for determining the initial admission of air to one of the inlets and permitting discharge from the other air inlet into the intermediate stack flue, and a gas valve for determining the initial admission of gas to one of the gas inlets, and permitting discharge from the other gas inlet into the intermediate stack flue, whereby when air and gas are initially admitted through air and gas inlets a continuous circuit is effected for discharging through the stack, substantially as described.

9. In a heating furnace, the combination of a heating chamber, a pair of air regenerating chambers, a pair of gas regenerating chambers, air flues leading from a common supply to the air regenerating chambers, gas flues leading from a common supply to the gas regenerating chambers, an air flue leading from the air chambers to the heating chamber, a gas flue leading from the gas regenerating chambers to the heating chamber, a flue leading from the heating chamber to all of the regenerating chambers, valves for reversing the flow of gas and air through the respective sets of regenerating chambers, and valves for reversing the flow of gas and air through the inlet flues, substantially as described.

10. In a heating furnace, the combination of a heating chamber, a pair of air regenerating chambers, a pair of gas regenerating chambers, means for introducing air to either of the air regenerating chambers, means for introducing gas to either of the gas regenerating chambers, a common flue leading from both of the air regenerating chambers to the heating chamber, a common flue leading from both of the gas regenerating chambers to the heating chamber, a common flue leading from the heating chamber to all of the regenerating chambers, and means for determining which of the regenerating chambers are in communication with the flues leading to the heating chamber, substantially as described.

ROBT. SMITH.
ROBERT STEPHENSON.

Witnesses:
WALKER BANNING,
MARY R. FROST.